US 8,589,905 B2

(12) United States Patent
Miwa et al.

(10) Patent No.: US 8,589,905 B2
(45) Date of Patent: Nov. 19, 2013

(54) GAME DEVICE AND INFORMATION PROCESSING APPARATUS

(75) Inventors: Yasutaka Miwa, Tokyo (JP); Tsunehisa Kazawa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 543 days.

(21) Appl. No.: 12/575,659

(22) Filed: Oct. 8, 2009

(65) Prior Publication Data

US 2010/0095290 A1    Apr. 15, 2010

(30) Foreign Application Priority Data

Oct. 10, 2008   (JP) .................................. 2008-264591

(51) Int. Cl.
*G06F 9/44* (2006.01)
*G06F 9/00* (2006.01)
*G06F 17/00* (2006.01)

(52) U.S. Cl.
USPC ........... 717/170; 717/168; 717/169; 717/171; 717/172; 717/173; 717/122; 713/2; 713/100; 463/24; 463/29; 463/30; 463/31; 463/32; 463/33; 463/34; 463/35; 463/36; 463/39; 463/43; 463/44; 463/45; 463/46; 463/47

(58) Field of Classification Search
None
See application file for complete search history.

(56) References Cited

U.S. PATENT DOCUMENTS

| | | | |
|---|---|---|---|
| 6,988,267 B2 * | 1/2006 | Harris et al. .................. 717/173 |
| 7,251,812 B1 * | 7/2007 | Jhanwar et al. ............... 717/171 |
| 7,496,739 B1 * | 2/2009 | Raghavan et al. ................. 713/1 |
| 7,685,593 B2 * | 3/2010 | Solomon et al. .............. 717/170 |
| 7,716,661 B2 * | 5/2010 | Paul et al. ...................... 717/173 |
| 7,962,788 B2 * | 6/2011 | Manglik et al. .................. 714/25 |
| 2004/0158817 A1 * | 8/2004 | Okachi et al. ................. 717/122 |
| 2005/0262163 A1 * | 11/2005 | Seki et al. ..................... 707/203 |
| 2005/0262496 A1 * | 11/2005 | Seki et al. ..................... 717/170 |
| 2006/0031827 A1 * | 2/2006 | Barfield et al. ................ 717/168 |
| 2008/0046708 A1 * | 2/2008 | Fitzgerald et al. ................ 713/2 |
| 2008/0141018 A1 * | 6/2008 | Tanaka et al. ..................... 713/2 |
| 2008/0189542 A1 * | 8/2008 | Tseng et al. ...................... 713/2 |
| 2008/0243947 A1 * | 10/2008 | Kaneda ......................... 707/203 |
| 2009/0106753 A1 * | 4/2009 | Wang et al. ................... 717/176 |
| 2010/0075759 A1 * | 3/2010 | Kawabata ....................... 463/42 |

FOREIGN PATENT DOCUMENTS

| | | |
|---|---|---|
| JP | 11-175324 | 7/1999 |
| JP | 2004-127253 | 4/2004 |
| JP | 2008-123139 | 5/2008 |

OTHER PUBLICATIONS

Japanese Office Action dated May 21, 2013, from Corresponding Japanese Patent Application No. 2008-264591.

* cited by examiner

*Primary Examiner* — Henry Tsai
*Assistant Examiner* — Jing-Yih Shyu
(74) *Attorney, Agent, or Firm* — Katten Muchin Rosenman LLP

(57) ABSTRACT

A version file retrieving unit of a game device retrieves via a network a version file including version information identifying an OS recommended for the execution of game software running. An OS version comparing unit compares first version information on the OS running with second version information identifying the OS recommended for the execution of the game software running. When the second version indicates a version newer than that of the first version information, the OS retrieving unit downloads the latest OS and stores it in the hard disk drive.

5 Claims, 5 Drawing Sheets

ABCD.XYZ

GAME DEVICE AND INFORMATION PROCESSING APPARATUS

BACKGROUND OF THE INVENTION

1. Field of the Invention

The present invention relates to an information processing technology implemented in information processing apparatuses such as game devices.

2. Description of the Related Art

Generally, game software is distributed and sold in the form of ROM media such as optical disks, magneto-optical disks, and blue ray disks. Since the game software recorded on a ROM medium cannot be rewritten, fixing of bugs in the game software and modification/addition of functions are addressed by applying a patch. Patent document No. 1 discloses a game device adapted to compare the version information stored in the recording medium with the version information included in the patch file, load the startup file assigned newer version information into the memory, and perform the process of starting the game.

[Patent document No. 1] US 2008/0141018

When the game device is turned on, the operating system (hereinafter, simply referred to as "OS") is started, preparing an environment in which to execute the game software. The OS is updated fairly frequently for reasons of bug fixes or expansion of functions. When the OS is updated, patch files subsequently created are usually designed to run on the updated OS.

Since the updated OS encompasses the functions of the previous versions of the OS, the game device is capable of creating an environment in which the patch file can be used, by installing the latest version of the OS without fail. However, since the patch file is applied to the game software, it is not normally necessary to install the latest version of the OS in the game device unless a patch file is available for the game software. Since the data volume of the OS is relatively large, it is not favorable, in terms of time and cost, to download the OS in the game device each time the OS is updated and regardless of the need. Accordingly, there is a need to build a scheme for efficiently downloading the OS when the game device needs the OS for the execution of the game software.

SUMMARY OF THE INVENTION

Accordingly, a purpose of the present invention is to provide a technology of downloading a file suitably.

To address the purpose, the game device according to at least one embodiment of the present invention comprises: an operating system executing unit operative to execute an operating system identified by first version information; an application executing unit operative to start game software; a version file retrieving unit operative to retrieve via a network a version file that includes second version information identifying an operating system recommended for the execution of the game software, by using identification information of the game software thus started; a first version comparing unit operative to compare the first version information with the second version information; and an operating system retrieving unit operative to retrieve via the network an operating system identified by the second version information or an operating system identified by version information indicating a version newer than that indicated by the second version information, when the second version information indicates a version newer than that of the first version information.

The information processing apparatus according to another embodiment of the present invention comprises: an operating system executing unit operative to execute an operating system identified by first version information; an application executing unit operative to start a software application; a version file retrieving unit operative to retrieve via a network a version file that includes second version information identifying an operating system recommended for the execution of the software application thus started; a first version comparing unit operative to compare the first version information with the second version information; and an operating system retrieving unit operative to retrieve via the network an operating system identified by the second version information or an operating system identified by version information indicating a version newer than that indicated by the second version information, when the second version information indicates a version newer than that of the first version information.

Optional combinations of the aforementioned constituting elements, and implementations of the invention in the form of methods, apparatuses, systems, recording mediums and computer programs may also be practiced as additional modes of the present invention.

DETAILED DESCRIPTION OF THE INVENTION

Figure 1:
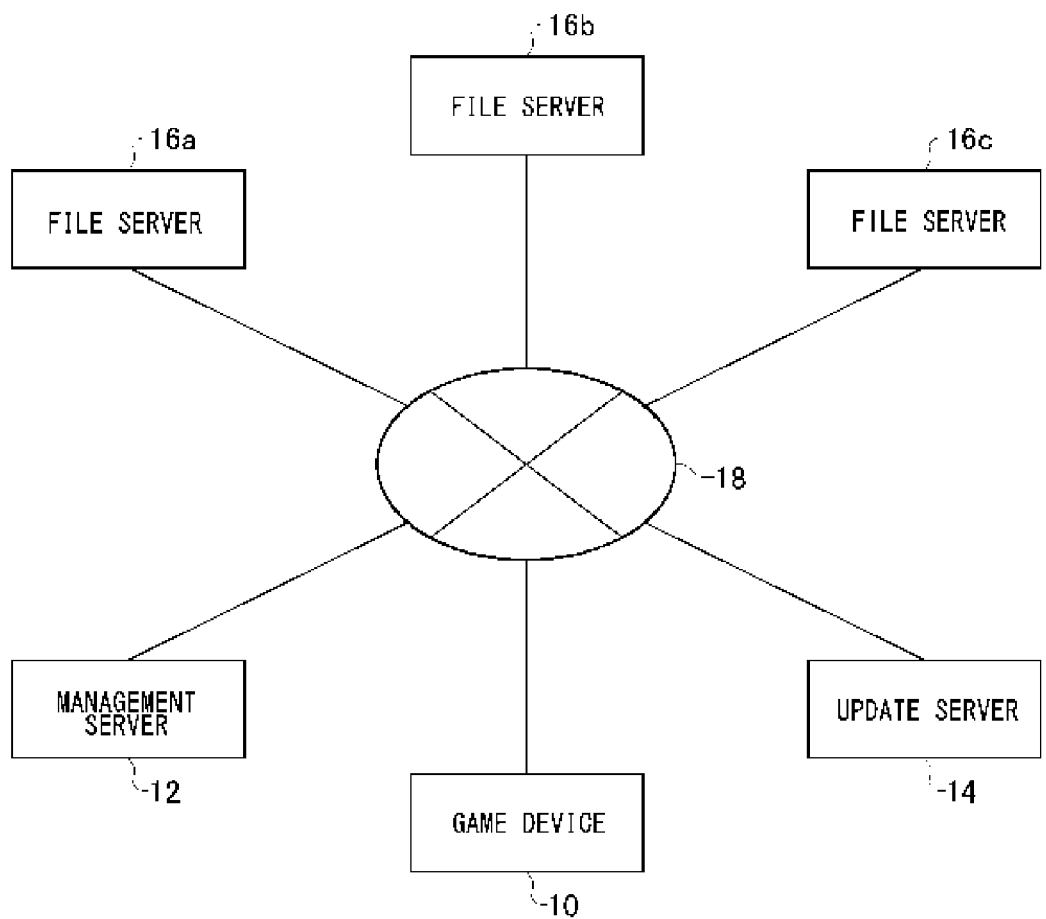
FIG. 1 shows a file retrieval system according to an embodiment of the present invention.

The invention will now be described by reference to the preferred embodiments. This does not intend to limit the scope of the present invention, but to exemplify the invention. FIG. 1 shows a file retrieval system 1 according to an embodiment of the present invention. The file retrieval system 1 is built in a game system that provides a suitable environment for executing game software. The system supports the retrieval of an OS recommended for the execution of the game software in a user terminal and the retrieval of a patch file applied to the game software.

The file retrieval system 1 comprises a game device 10, which is a user terminal, a management server 12 for managing the versions of the patch file applied to the game software, an update server 14 for providing the latest OS, file servers 16a, 16b, and 16c for providing patch files (hereinafter, generically referred to as file servers 16). The game device 10, the management server 12, the update server 14, and the file servers 16 are communicably connected to each other via a network 18 such as the Internet.

The management server 12 is run by the operator of the game system. The server 12 maintains a version file of each game software item. A version file contains patch information that associates i) version information on a patch file, ii) version information identifying the OS recommended for the use of the patch file, and iii) address information indicating the location where the patch file is stored, with each other. If a plurality of patch files are available for a game software item, the version file contains patch information related to the respective patch files. The version file contains version information identifying the OS recommended for proper execution of the game software, irrespective of whether patch files are available. The OS version information contained in the patch information is designated by the game manufacturer. The version information on an OS required for proper execution of the game software is designated by the operator of the game system.

The management server 12 stores a version file at an address (URL) in which the identification information on the game software (hereinafter, referred to as "title ID") is used as the directory name and/or the file name. The management server 12 and the game device 10 share the same method of generating an address in which the title ID of the game software is used as the directory name and/or the file name. Therefore, the game device 10 is capable of retrieving the version file of the game software by generating the address using the title ID of the game software running and accessing the management server 12 accordingly.

The update server 14 is managed by operator of the game system and stores the latest OS. When the operator of the game system generates the latest OS, the OS stored hitherto is replaced by the latest OS. Thus, the update server 14 is capable of providing the game device 10 with the latest OS without fail.

In the embodiment, the OS is installed and executed in the game device 10, creating an interface (API and ABI) for running the application software. The OS is provided with the function of managing processes on the game device 10, the memory management function, the network connection function, a file system, and the like. The OS also includes a graphical user interface (GUI) and device drivers. By executing the OS installed, the game device 10 is capable of running application software. By downloading the latest OS, the function of the OS is expanded.

The update server 14 stores an OS information file that contains version information on the latest OS and address information indicating the address where the latest OS is stored. The game device 10 stores an address to retrieve the OS information file from. When the game device 10 is connected to the network 18 at power-on, the game device 10 downloads the OS information file. This allows the game device 10 to retrieve the version information on the latest OS and the address information on the OS.

The file server 16 is managed by the game manufacturer and stores a patch file to be applied to the game software. The patch file is used to fix a bug of a program in a ROM medium, or to change or add a function. When the game manufacturer produces a patch file of game software, the manufacturer stores the file in the file server 16 so that the game device 10 is capable of downloading the patch file from the file server 16. When the game manufacturer makes the patch file they produced downloadable, the manufacturer notifies the operator of the game system of patch information, which contains a title ID, version information on the patch file, version information identifying the OS required for the use of the patch file, and address information indicating the location where the patch file is stored. The notification may be done on-line or off-line. Upon receipt of the patch information, the system operator appends the content of the patch information to the version file, updating the version file accordingly.

When the game device 10 in the file retrieval system 1 according to the embodiment is turned on, the game device 10 starts the OS and retrieves the OS information file from the update server 14 by connecting to the address storing the OS information file. In this process, the game device 10 compares the version information on the OS thus started and the version information contained in the information file so as to determine whether a version of the OS newer than the OS running is downloadable from the network 18. When a version of the OS newer than the OS running is downloadable via the network 18, the game device 10 displays on a display device a screen that prompts the user to confirm whether to download the latest OS. The user provides an input to indicate to the game device 10 that the latest OS should not be downloaded. The game device 10 does not download the OS. A description will be given of a case where the game device 10 downloads the OS when the game device 10 needs the OS for the execution of application software.

The game device 10 then starts the game software. While running a startup process, the game device 10 concurrently accesses the management server 12 via the network 18 so as to retrieve the version file of the game software thus started. The game device 10 determines whether the version file contains version information indicating a version of a patch file newer than that indicated by the version information on the game software and patch file stored in the game device 10. When the version file contains version information on a patch file not stored in the game device 10, the game device 10 retrieves the version information on the OS required for the use of the patch file of that version and compares the version information thus retrieved with the version information on the OS running. When the version information on the OS required for the use of the patch file indicates a version newer than that indicated by the version information on the OS running, the game device 10 accesses the update server 14, downloads the latest OS, and re-starts the downloaded OS.

After re-starting the latest OS, the game device 10 performs the aforementioned process again. In other words, the game device 10 starts the game software again. While running a startup process, the game device 10 concurrently accesses the management server 12 via the network 18 so as to retrieve the version file of the game software thus started. The game device 10 determines whether the version file contains version information indicating a version of a patch file newer than that indicated by the version information on the game software and patch file stored in the game device 10. The version file contains version information on a patch file not stored in the game device 10. Therefore, the game device 10 retrieves the version information on the OS required for the use of the patch file of that version and compares the version information thus retrieved with the version information on the OS running.

Since the latest OS is running in the game device 10, the version information on the OS running should indicate a version identical to or newer than the version indicated by the version information on the OS required for the use of the patch file. This allows the game device 10 to determine that it is not necessary to download the OS. The game device 10 accesses the file server 16, downloads the patch file not stored in the game device 10, and re-starts the game software.

The technology of the embodiment may not necessarily be implemented in the game device 10 but can be implemented in an information processing apparatus that supports a ROM medium storing a program such as accounting software or CAD software.

Figure 2:
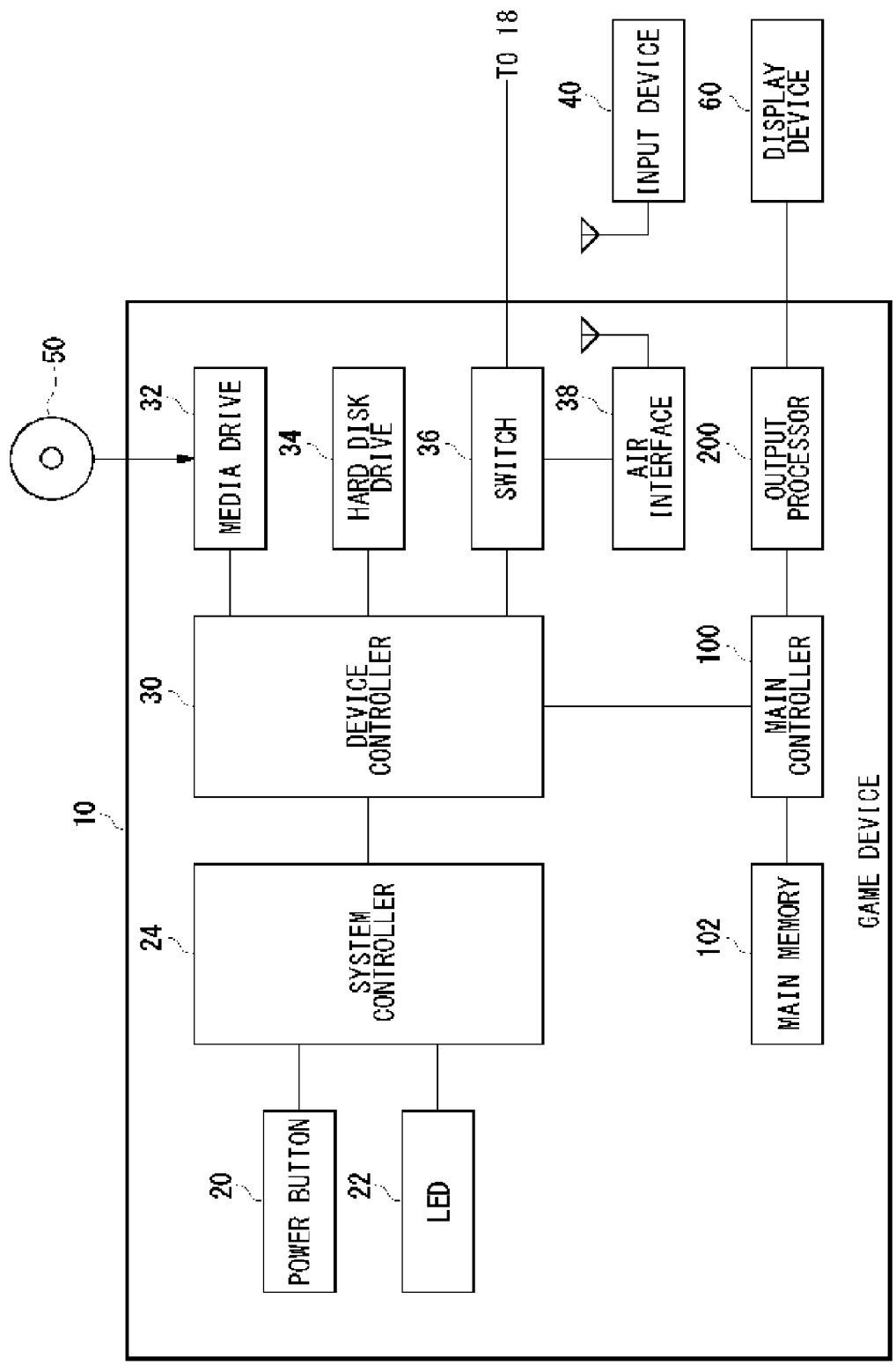
FIG. 2 is a functional block diagram of the game device.

FIG. 2 is a functional block diagram of the game device 10. The game device 10 comprises a power button 20, an LED 22, a system controller 24, a device controller 30, a media drive 32, a hard disk drive 34, a switch 36, an air interface 38, a main controller 100, a main memory 102, and an output processor 200.

The power button 20 is an input unit where a control input from the user is provided. The button is operated to turn the game device 10 on or off. The power button 20 may be a down pressure button so that power may be turned on or off by pressing the button 20. Other structures, such as a touch sensor, that allows the user to turn the power on or off may be used to implement the power button 20. The LED 22 is turned on or off to indicate whether the power is turned on or off. The system controller 24 detects the pressed state or the non-pressed state of the power button 20. Upon detecting the transition from the power-off state to the pressed state, the system controller 24 activates the main controller 100 and turns the LED 22 on. When a power cable is connected to the game device 10, the system controller 24 maintains the standby mode even in the power-off state and monitors the depression of the power button 20.

Like a south bridge, the device controller 30 is configured as a large-scale integrated circuit (LSI) for executing the delivery of information between devices. As illustrated, the system controller 24, the media drive 32, the hard disk drive 34, the switch 36, and the main controller 100 are connected to the device controller 30. The device controller 30 controls the timing of data transfer, canceling differences in electrical property of the devices or differences in data transfer rates thereof.

The media drive 32 drives a ROM 50 storing game software and mounted thereon so as to read the game software from the ROM medium 50. The ROM medium 50 is a read-only recording medium such as an optical disk, magneto-optical disk, or blue ray disk. The game software includes, for example, a main program for running the game application, a startup file for starting the main program, game data such as game characters and scenario, title ID of the game software, version information on the game software, and version information on the OS required for the execution of the game software.

The main program is a program required for the execution of an application. By running the main program, the game application is run accordingly. The startup file is a program for starting the main program. By running the startup file, the main program is called and executed.

The requirement for the version information on the game software and the version information on the patch file (mentioned above) is to define the order in which the game software and patch files are created. A newly created patch file may be assigned version information indicating a version number larger than that of the previously created patch files and that of the game software. For example, the game software may be assigned version information indicating a version number "1", the patch file created first may be assigned version information indicating a version number "2", and the patch file created subsequently may be assigned version information indicating a version number "3". Information identifying the date that the game software was created in the year-month-date format may be assigned to the game software as version information, and information identifying the date that the patch file was created in the year-month-date format may be assigned to the patch file as version information. The same is true of the version information on the OS. The requirement is that information identifying the order that the OS's are created is assigned to the OS.

The hard disk drive 34 is an auxiliary storage device that drives a built-in hard disk so as to write and read data using a magnetic head. The switch 36 is an Ethernet (registered trademark) switch and is a device connected wirelessly or by cable to an external device for transmission and reception of information. In this embodiment, a cable is connected to the switch 36, communicably connecting the switch 36 to the network 18. The switch 36 is connected to the air interface 38. The air interface 38 is connected to an input device 40 provided with the function of communicating wirelessly using a communication protocol such as the Bluetooth protocol (registered trademark) or the IEEE802.11 protocol. The input device 40 is an input means where the user provides a control input.

The main controller 100 is provided with a multicore CPU. One general-purpose processor core and a plurality of simple processor cores are provided in a single CPU. The general-purpose processor core is referred to as a power processing unit (PPU) and the processor cores are referred to as synergistic-processing units (SPU).

The main controller 100 is provided with a memory controller connected to the main memory 102 (main storage device). The PPU is provided with a register and a main processor as an entity of execution. The PPU allocates tasks as basic units of processing in applications to the respective SPUs. The PPU itself may execute a task. The SPU is provided with a register, a subprocessor as an entity of execution, and a local memory (dedicated RAM) as a local storage area. The SPU is provided with a dedicated direct memory access (DMA) controller as a control unit. By performing data transfer between the main memory 102 and the local memory, a stream of data can be processed at a high speed, and high-speed data transfer is achieved between a frame memory built in the output processor 200 and the local memory.

The output processor 200 is connected to the display device 60 and outputs a video signal and an audio signal resulting from executing the application. The output processor 200 is provided with a graphics processing unit (GPU) that implements image processing functions. High definition multimedia interface (HDMI) is employed in the GPU is capable of outputting the video signal in the digital format.

Figure 3:
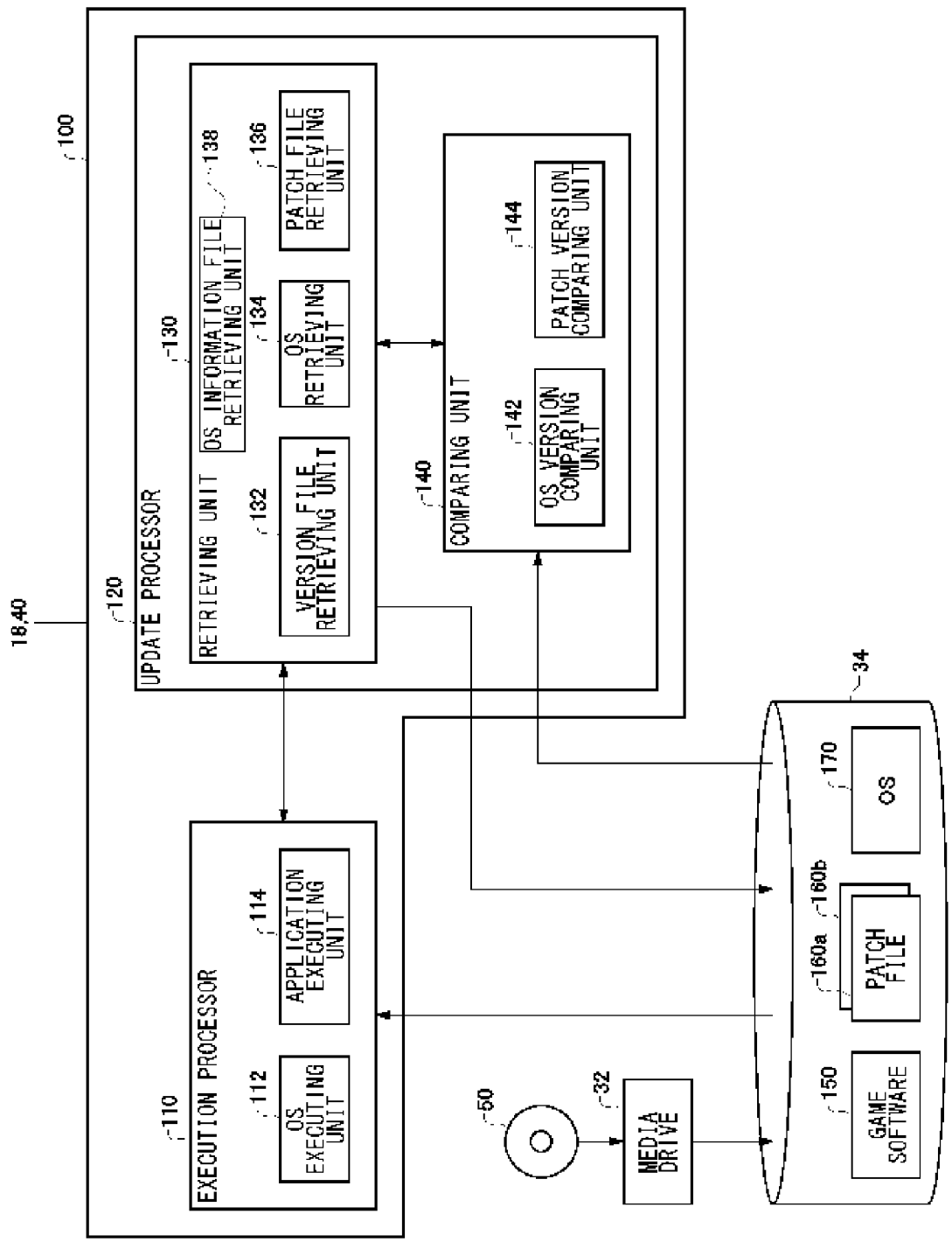
FIG. 3 shows functional blocks for performing a file retrieving process in the game device.

FIG. 3 shows functional blocks for performing a file retrieving process in the game device 10. Referring to FIG. 3, interfaces such as the device controller 30 are omitted from the illustration. The main controller 100 is provided with an execution processor 110 and an update processor 120. The execution processor 110 is provided with an OS executing unit 112 for executing an OS and an application executing unit 114 for executing an application. The update processor 120 is provided with a retrieving unit 130 and a comparing unit 140. The retrieving unit 130 is provided with a version file retrieving unit 132, an OS retrieving unit 134, a patch file retrieving unit 136, and an OS information file retrieving unit 138. The comparing unit 140 is provided with an OS version comparing unit 142 and a patch version comparing unit 144.

The elements depicted in FIG. 3, etc. as functional blocks for performing various processes are implemented in hardware by CPUs, memories, or other LSI's, and in software by programs etc., loaded into the memory. As mentioned before, the main controller 100 is provided with a single PPU and a plurality of SPUs. The PPU and the SPUs can form functional blocks either alone or in combination. Therefore, it will be obvious to those skilled in the art that the functional blocks may be implemented in a variety of manners by hardware only, software only, or a combination of thereof.

Figure 4:
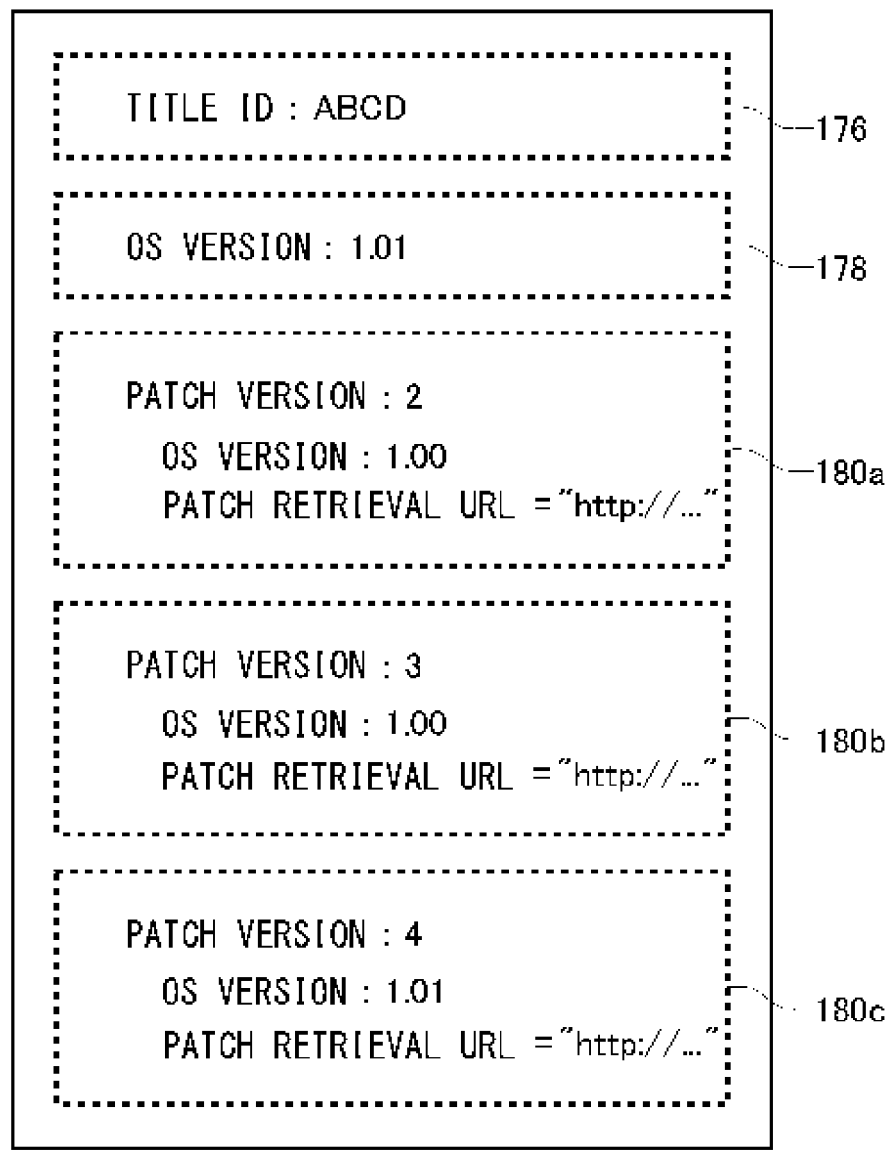
FIG. 4 shows an example of a version file.

When the power is turned on, the OS executing unit 112 starts an OS 170 stored in the hard disk drive 34. It is assumed that the version information on the OS 170 indicates a version "1.00". The OS 170 thus started starts a file retrieving program stored in the hard disk drive 34. The function implemented by the file retrieving program is illustrated in FIG. 4 as the update processor 120.

When the switch 36 is connected to the network 18, the OS information file retrieving unit 138 accesses the update server 14 via the network 18, using the address in the OS information file stored in the device, and downloads and retrieves the OS information file. The OS information file includes the latest version information on the OS and the address information indicating the address of the latest OS.

The OS version comparing unit 142 compares the version information on the latest OS included in the OS information file and the version information on the OS running. When the version information on the latest OS indicates a version "1.01" or greater, the OS version comparing unit 142 determines that the OS with a version newer than the OS 170 running can be downloaded. The result of comparison is supplied to the OS retrieving unit 134.

Upon receipt of the result of comparison, the OS retrieving unit 134 displays on the display device 60 a screen that prompts the user to confirm whether to download the OS. When the user provides an input via the input device 40 to indicate that the latest OS should be downloaded, the OS retrieving unit 134 accesses the update server 14 and retrieves the latest OS.

Normally, however, the user cannot decide whether it is necessary to download the latest OS. Since the OS is updated quite frequently, it would be time-consuming and costly to retrieve and install the OS each time it is updated. The task would be inefficient for the user. A description will now be given of a process in which the user provides an input to indicate that the latest OS should not be downloaded in a prompt screen displayed on the display device 60 when the device is first connected to the network 18, and in which the latest OS is downloaded when it is required for the execution of the application software.

When the ROM medium 50 is mounted on the media drive 32, the media drive 32 reads the game software 150 from the ROM medium 50 into the hard disk drive 34. The game device 10 according to the embodiment does not run the game software from the ROM medium 50 but reads it into the hard disk drive 34 for execution.

Upon receipt of an instruction to run the game from the input device 40, the application executing unit 114 starts the game software 150 read into the hard disk drive 34. It will be assumed that the version information on the game software 150 indicates a version "1" and a title ID "ABCD".

When the game software 150 is started, the version file retrieving unit 132 generates an address for retrieving the version file of the game software 150, using a predefined address generation method. The address of the game software 150 with the title ID "ABCD" is set as described below using the address generation method. http://www.*.com/ABCD/ABCD.XYZ "www.*.com" identifies the management server 12, "ABCD/ABCD.XYZ" identifies the file name (ABCD.XYZ) included in the directory (ABCD) of the management server 12. In other words, the address generation method uses the title ID of the game software as a directory name and a file name. Thus, by allowing the manager of the management server 12 to store a version file of each game software item in a directory identified by the title ID and using a file name identified by the title ID, the game device 10 is capable of retrieving the version file of the game software running.

The version file retrieving unit 132 accesses the management server 12 via the network 18, using the address thus generated, and downloads and retrieves the version file of the game software 150.

FIG. 4 shows an example of a version file. FIG. 4 schematically shows information included in a version file. A version file may be described in the XML format. The file name of the illustrated version file is "ABCD.XYZ". The version file includes title information 176, version information 178, and patch information 180a, 180b, and 180c.

The title information 176 is information identifying a title ID. In the illustrated example, the title ID is "ABCD". The version information 178 is information identifying the OS recommend for the execution of the game software 150 that is started. In the illustrated example, the version information "1.01" is set.

The version information 178 is set by the operator of the game system. In the presence of defects such as bugs in the OS with a version older than 1.01, the game software may not run as intended. Such a bug is identified as the user plays the game and reported to the operator of the game system so that operator fixes the OS.

Whether a bug included in the OS affects the operation of the game software depends on the game software. A bug may not necessarily cause the game software to operate unfavorably. Basically, there is no need to install a new OS for the game software that will not operate unfavorably due to the bug. It will be a waste of time and cost to have the game device download the OS even in such a situation. Thus, the version information 178 is set in the version file to identify the OS recommended for the execution of the game software that is started. The game device 10 determines whether the game software 150 will operate favorably under the OS 170 running, by referring to the version information 178.

In this illustrative embodiment, the version information on the OS 170 running indicates the version "1.00" and the version information 178 included in the version file is set to "1.01". Therefore, the game device 10 can recognize that it is preferable to download the OS. Meanwhile, when the version information 178 indicates the version "1.00", the game device 10 can recognize that the game software can operate favorably under the OS 170 running. Therefore, the game device 10 can recognize that there is no need to download the OS for the execution of to game software.

The version file includes three items of patch information 180a, 180b, and 180c. The patch information 180 associates i) version information on a patch file of the game software, ii) version information identifying the OS recommended for the use of the patch file, and iii) address information indicating the location where the patch file is stored, with each other. Referring to FIG. 4, the version information on a patch file is indicated as "patch version", the version information identifying a recommended OS is indicated as "OS version", and the address information is indicated as "patch retrieval URL". The game device 10 can retrieve the patch file by connecting to the patch retrieval URL.

The patch information items 180a, 180b, and 180c are information on the respective patch files. In the illustrated example, three patch files are indicated as being available for the game software 150 with a title ID "ABCD". The patch information items 180a, 180b, and 180c are listed in the chronological order of generation from top to bottom.

The patch information 180a indicates that the associated patch file is assigned a version number "2" and the version number of the OS required for the use of the patch file is "1.00". The patch information 180b indicates that the associated patch file is assigned a version number "3" and the version number of the OS required for the use of the patch file is "1.00". The patch information 180c indicates that the associated patch file is assigned a version number "4" and the version number of the OS required for the use of the patch file is "1.01". The illustrated example shows that the version 1.00 of the OS is sufficient to exploit the versions 2 and 3 of the patch file and that the version 1.01 of the OS is required to suitably exploit the version 4 of the patch file.

Example 1

A description will be given of example 1 where the OS is downloaded irrespective of whether the patch file is downloaded.

Referring back to FIG. 3, when the version file retrieving unit 132 retrieves the version file of the game software 150, the OS version comparing unit 142 compares the version information on the OS recommended for the execution of the game software 150 with the version information on the OS running. Since the version information on the OS recommended for the execution of the game software 150 indicates the version "1.01" and the version information on the OS running indicates the version "1.00", the OS version comparing unit 142 determines that the version information on the OS recommended for the execution of the game software 150 indicates a version newer than that of the version information on the OS running. The result of comparison is supplied to the OS retrieving unit 134.

Upon receipt of the result of comparison, the OS retrieving unit 134 uses the address information included in the OS information file to access the update server 14 and retrieve the OS identified by the version number 1.01 or newer. As described above, the update server 14 maintains only the latest OS in a downloadable state so that the OS retrieving unit 134 retrieves the latest OS. The OS retrieving unit 134 stores the OS thus retrieved in the hard disk drive 34.

Before accessing the update server 14, the OS retrieving unit 134 may cause the display device 60 to display a screen that prompts the user to confirm whether to download the OS. In this case, the OS retrieving unit 134 accesses the update server 14 and downloads the latest OS when the user provides an input via the input device 40 to indicate that the latest OS should be downloaded.

When the version information on the OS recommended for the execution of the game software 150 indicates a version identical to or older than the version indicated by the version information of the OS running, the OS version comparing unit 142 determines that the game software 150 will operate favorably under the OS running. Accordingly, the OS retrieving unit 134 does not access the update server 14 and does not retrieve the OS.

Example 2

A description will be given of example 2 where the OS is downloaded on the assumption that the patch file is downloaded.

When the version file retrieving unit 132 retrieves the version file of the game software 150, the OS version comparing unit 142 compares the OS version information included in the patch information 180*a*, 180*b*, and 180*c* with the version information on the OS running. The version information on the OS required for use of the versions 2 and 3 of the patch file indicates the version "1.00", and the version information on the OS required for the use of the version 4 of the patch file is "1.01". Since the version information on the OS running indicates the version "1.00", the OS version comparing unit 142 determines that the version on the OS required for the use of the version 4 of the patch file is newer than the version indicated by the version information on the OS running. The result of comparison is supplied to the OS retrieving unit 134.

Upon receipt of the result of comparison, the OS retrieving unit 134 uses the address information included in the OS information file to access the update server 14 and retrieve the OS identified by the version number 1.01 or newer. The update server 14 maintains only the latest OS in a downloadable state so that the OS retrieving unit 134 retrieves the latest OS. The OS retrieving unit 134 stores the OS thus retrieved in the hard disk drive 34.

Before accessing the update server 14, the OS retrieving unit 134 may cause the display device 60 to display a screen that prompts the user to confirm whether to download the OS. In this case, the OS retrieving unit 134 accesses the update server 14 and downloads the latest OS when the user provides an input via the input device 40 to indicate that the latest OS should be downloaded.

Example 3

A description will be given of examples 1 and 2 combined where the OS suitable for the execution of the game software is downloaded.

When the version file retrieving unit 132 retrieves the version file of the game software 150, the OS version comparing unit 142 compares the version information 178, the OS version information included in the patch information 180*a*, 180*b*, and 180*c*, and the version information on the OS running with each other. The version information 178 indicates the version "1.01", the version information on the OS required for the use of the versions 2 and 3 of the patch file indicates the version "1.00", and the version information on the OS required for the use of the version 4 of the patch file indicates the version "1.01". Since the version information on the OS running indicates the version "1.00", the OS version comparing unit 142 determines that the version, as indicated by the version information, of the OS recommended for the execution of the game software 150 and the version, as indicated by the version information, of the OS required for the use of the version 4 of the patch file are newer than the version, as indicated by the version information, of the OS running. In other words, in example 3, the latest of the OS version information included in the version file is compared with the version information on the OS running. The result of comparison is supplied to the OS retrieving unit 134 so that the OS retrieving unit 134 retrieves the latest OS. The OS retrieving unit 134 stores the OS thus retrieved in the hard disk drive 34.

Before accessing the update server 14, the OS retrieving unit 134 may cause the display device 60 to display a screen that prompts the user to confirm whether to download the OS. In this case, the OS retrieving unit 134 accesses the update server 14 and downloads the latest OS when the user provides an input via the input device 40 to indicate that the latest OS should be downloaded.

When the OS retrieving unit 134 stores the latest OS in the hard disk drive 34, the OS executing unit 112 terminates the execution of the OS 170 running and starts the latest OS retrieved. The game device 10, re-started under the latest OS, builds an environment in which the game software 150 can be suitably run and the patch file can be downloaded and used.

The OS 170 thus started starts the file retrieving program stored in the hard disk drive 34. The OS information file retrieving unit 138 accesses the update server 14 via the network 18, using the address in the OS information file stored in the device, and downloads and retrieves the OS information file. The OS version comparing unit 142 compares the version information on the latest OS included in the OS information file with the version information on the OS running. Since the OS running is the latest version, the OS version comparing unit 142 determines that it is not necessary to download the OS from the update server 14.

Upon receipt of an instruction to run the game from the input device 40, the application executing unit 114 starts the game software 150 read into the hard disk drive 34. When the game software 150 is started, the version file retrieving unit 132 generates an address for retrieving the version file of the game software 150, using the predefined address generation method. The version file retrieving unit 132 accesses the management server 12 via the network 18, using the address thus generated, and downloads and retrieves the version file (ABCD.XYZ) for the game software 150.

A description will be given of the process of retrieving a patch file based on example 3 described above. When the version file retrieving unit 132 retrieves the version file of the game software 150, the OS version comparing unit 142 compares the version information 178, the OS version information included in the patch information 180a, 180b, and 180c, and the version information on the OS running with each other. The version information 178 indicates the version "1.01", the version information on the OS required for the use of the versions 2 and 3 of the patch file indicates the version "1.00", and the version information on the OS required for the use of the version 4 of the patch file indicates the version "1.01". Since the version information on the latest OS running indicates the version 1.01 or newer, the OS version comparing unit 142 determines that the version information on the OS running indicates a version identical to or newer than that indicated by the OS version information included in the version file. Therefore, the OS retrieving unit 134 does not perform the process of retrieving the OS.

Responsive to the result of comparison, the patch version comparing unit 144 compares the version information on the patch file to be applied to the game software 150 running with the version information included in the version file. The game device 10 already stores the patch files 160a and 160b in the hard disk drive 34. It will be assumed that the version information on the patch file 160a indicates the version "2" and the version information on the patch file 160b indicates the version "3". Accordingly, the patch version comparing unit 144 compares the version numbers "2" and "3" of the patch files 160a and 160b to be applied to the game software 150 running with the version numbers "238", "3", and "4" included in the version file and determines that the version number "4" included in the version file is newer than the version number of the patch file to be applied to the game software running. The result of comparison is supplied to the patch file retrieving unit 136.

Responsive to the result of comparison, the patch file retrieving unit 136 accesses the file server 16 to retrieve the patch file identified by the version number "4". The address to retrieve the version 4 of the patch file from is described as "patch retrieval URL" in the patch information 180c. The patch file retrieving unit 136 accesses the address to retrieve the version 4 of the patch file and store the file in the hard disk drive 34. When a new patch file is retrieved, the application executing unit 114 re-starts the game software 150 and applies the patch file thus retrieved.

Unless the OS required for the use of the patch file is installed, the patch file cannot be applied to the game software even if the file is retrieved. Thus, the game device 10 may download the OS required for the use of the patch file before downloading the patch file. In this way, the game device 10 may suitably apply the patch file downloaded to the game software.

Figure 5:
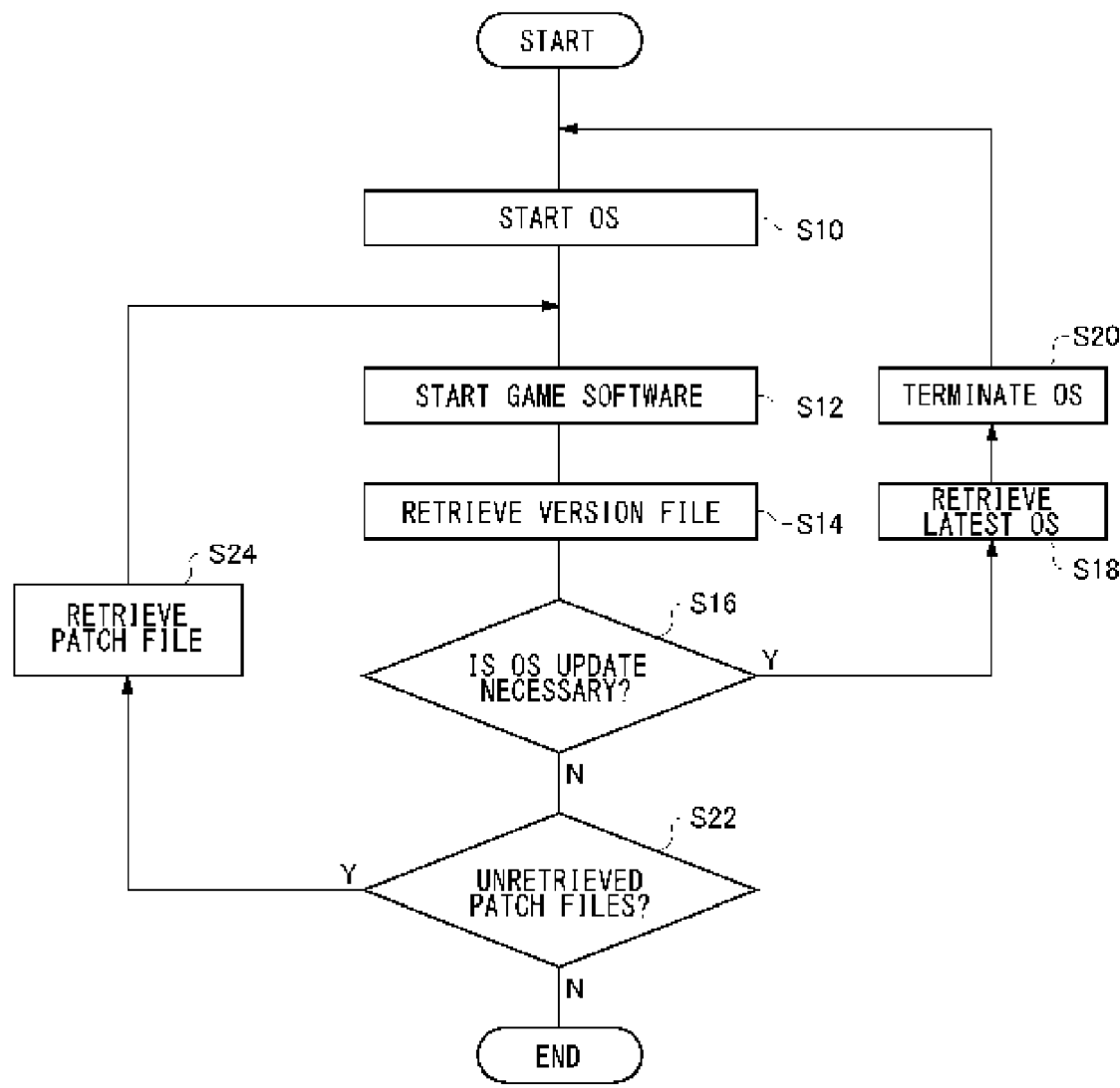
FIG. 5 is a flowchart showing the process of retrieving a file in the game device.

FIG. 5 is a flowchart showing the process of retrieving a file in the game device 10. The OS executing unit 112 runs the version 1.00 of the OS stored in the hard disk drive (S10). When the application executing unit 114 starts the game software (S12), the version file retrieving unit 132 retrieves the version file from the management server 12 (S14). The OS version comparing unit 142 compares the version information (1.00) on the OS running with the OS version information included in the version file (S16).

For example, the OS version comparing unit 142 compares the version information on the OS running with the version information on the OS recommended for the execution of the game software started. When the version information on the OS suitable for the execution of the game software started indicates a newer version, the OS version comparing unit 142 determines that it is necessary to update the OS (Y in S16). Meanwhile, when the version information on the OS running indicates a newer version, the OS version comparing unit 142 determines that it is not necessary to update the OS (N in S16).

Alternatively, the OS version comparing unit 142 may compare the version information on the OS running with the version information on the OS required for the use of the patch file. When the version information on the OS required for the use of the patch file indicates a newer version, the OS version comparing unit 142 may determine that it is necessary to update the OS (Y in S16). Meanwhile, when the version information on the OS running indicates a newer version, the OS version comparing unit 142 may determine that it is not necessary to update the OS (N in S16).

When it is determined that it is necessary to update the OS (Y in S16), the OS retrieving unit 134 downloads and retrieves the latest OS from the update server 14 (S18) and stores it in the hard disk drive 34. The OS executing unit 112 terminates the OS running (S20) and re-starts the latest OS thus retrieved (S10). Hereinafter, the steps S12-S16 are performed.

When it is determined that it is not necessary to update the OS (N in S16), the patch version comparing unit 144 refers to the version file and determines whether there are any patch files that remain unretrieved. The determination may be made by comparing the patch file version information included in the version file with the version information on the patch file stored in the hard disk drive 34. When there is any unretrieved patch file (Y in S22), the patch file retrieving unit 136 downloads and retrieves the patch file from the file server 16 (S24) and stores the file in the hard disk drive 34. The application executing unit 114 re-starts the game software (S12) and runs the game software by applying the patch file stored in the hard disk drive 34. Subsequently, the steps S14-S22 are performed. When it is determined that there are no unretrieved files (N in S22), the file retrieving process is terminated.

Described above is an explanation based on an exemplary embodiment. The embodiment is intended to be illustrative only and it will be obvious to those skilled in the art that various modifications to constituting elements and processes could be developed and that such modifications are also within the scope of the present invention. In the embodiment, the ROM medium was given as an example of the recording medium storing the game software. Alternatively, the recording medium may be any rewritable medium.

The OS executing unit 112 starts the OS 170 so as to execute the network connection function. The OS executing unit 112 stores the version information on the OS at least provided with the function for network connection. When the version information on the OS 170 running indicates a version identical to or newer than that indicated by the version information stored, the function for network connection is activated so that the game device 10 can connect to the network 18. In this case, it will be assumed that the version of the OS at least provided with the function for network connection is "1.00". Since the version of the OS at least provided with the function for network connection is "1.00", the game device 10 can connect to the network 18 while the version 1.00 of the OS 170 is running.

Some game software is capable of connecting to the network 18 for online match-up. For online match-up, it is preferable that the players place the game devices 10 in the same environment. The game system according to the embodiment is configured to prevent the network game from being run unless the OS identified by the version information 178 shown in FIG. 4 is installed.

When the application executing unit 114 starts the game software 150, the OS executing unit 112 determines that the version information 178 indicates a version newer than that indicated by the version information on the OS 170 since the version information 178 in the version file retrieved indicates the version "1.01". The OS executing unit 112 thus prohibits connection to the network while the game software 150 is running. When the execution of the game software 150 is terminated, the OS executing unit 112 determines that the version information on the OS 170 indicates a version identical to the version of the OS at least provided with the function for network connection and activates the function for network connection. The game device 10 is then capable of connecting to the network 18.

Thus, the version information 178 is used to identify the version of the OS required for connection to the network 18 while the game software 150 is running and is used as a condition to determine whether online match-up can be played. By using the version information 178 to indicate the version of the OS required to connect to the network during the game, an incentive is given to the user to download the OS recommended for the execution of the game software. Further, the user environment for online matchup can be made available.

What is claimed is:

1. A game device comprising:
   an operating system executing unit operative to execute an operating system identified by a first version information;
   an application executing unit operative to start game software;
   a version file retrieving unit operative to retrieve via a network a version file that includes a second version information identifying an operating system recommended for the execution of the game software, by using identification information of the game software thus started;
   a first version comparing unit operative to compare the first version information with the second version information;
   an operating system retrieving unit operative to retrieve via the network an operating system identified by the second version information or an operating system identified by a third version information indicating a version newer than that indicated by the second version information, when the second version information indicates a version newer than that of the first version information,
   wherein the version file retrieving unit retrieves a version file that associates i) patch file version information on a patch file of the game software, ii) operating system version information identifying an operating system required for the use of the patch file, and iii) address information indicating the location where the patch file is stored;
   a second version comparing unit operative to compare, after the operating system executing unit terminates the operating system that is running and identified by the first version information and starts the operating system retrieved by the operation system retrieving unit, a patch file version information on a patch file that the application executing unit applies to the game software when starting the game software, with the patch file version information included in the version file; and
   a patch file retrieving unit operative to retrieve the patch file identified by the patch file version information included in the version file via the network, when the patch file version information included in the version file indicates aversion newer than that of the patch file version information on the patch file applied to the game software started.

2. The game device according to claim 1, wherein
   the operating system executing unit is operative to store operating system version information on an operating system required for connection to the network and execute the network connection function when the operating system version information on the operating system running indicates a version identical to or newer than that indicated by the operating system version information on the operating system required for connection to the network, and
   the operating system executing unit prohibits connection to the network while the game software is running, when the version indicated by the operating system version information included in the version file is newer than that indicated by the operating system version information on the operating system running.

3. An information processing apparatus comprising:
   an operating system executing unit operative to execute an operating system identified by a first version information;
   an application executing unit operative to start an application software;
   a version file retrieving unit operative to retrieve via a network a version file that includes a second version information identifying an operating system recommended for the execution of the application software thus started;
   a first version comparing unit operative to compare the first version information with the second version information;
   an operating system retrieving unit operative to retrieve via the network an operating system identified by the second version information or an operating system identified by a third version information indicating a version newer than that indicated by the second version information, when the second version information indicates a version newer than that of the first version information,
   wherein the version file retrieving unit retrieves a version file that associates i) patch file version information on a patch file of the application software, ii) operating system version information identifying an operating system required for the use of the patch file, and iii) address information indicating the location where the patch file is stored;
   a second version comparing unit operative to compare, after the operating system executing unit terminates the operating system that is running and identified by the first version information and starts the operating system retrieved by the operation system retrieving unit, a patch file version information on a patch file that the application executing unit applies to the application software when starting the application software, with the patch file version information included in the version file; and
   a patch file retrieving unit operative to retrieve the patch file identified by the patch file version information included in the version file via the network, when the patch file version information included in the version file indicates a version newer than that of the patch file version information on the patch file applied to the software application started.

4. A computer executable program product comprising:
a module that executes an operating system identified by a first version information;
a module that starts application software;
a module that retrieves via a network a version file that includes a second version information identifying an operating system recommended for the execution of the application software thus started;
a module that compares the first version information with the second version information;
a module that retrieves via the network an operating system identified by the second version information or an operating system identified by a third version information indicating a version newer than that indicated by the second version information, when the second version information indicates a version newer than that of the first version information,
wherein the module that retrieves the version file retrieves a version file that associates i) patch file version information on a patch file of the application software, ii) operating system version information identifying an operating system required for the use of the patch file, and iii) address information indicating the location where the patch file is stored;
a module that compares, after the operating system running the first version information is terminated and the operating system retrieved is started, a patch file version information on a patch file that is applied to the application software when starting the application software, with the patch file version information included in the version file; and
a module to retrieve the patch file identified by the patch file version information included in the version file via the network, when the patch file version information included in the version file indicates a version newer than that of the patch file version information on the patch file applied to the application software started.

5. A non-transitory computer readable medium encoded with a program according to claim 4.

* * * * *